United States Patent [19]

DiGiulio

[11] 4,430,449
[45] * Feb. 7, 1984

[54] FAST-COOL VINYL AROMATIC EXPANDABLE POLYMERS

[75] Inventor: Adolph V. DiGiulio, Wayne, Pa.

[73] Assignee: Atlantic Richfield Company, Los Angeles, Calif.

[*] Notice: The portion of the term of this patent subsequent to Oct. 4, 2000 has been disclaimed.

[21] Appl. No.: 494,828

[22] Filed: May 16, 1983

Related U.S. Application Data

[62] Division of Ser. No. 462,158, Jan. 31, 1983, Pat. No. 4,407,979.

[51] Int. Cl.$^3$ ............................................. C08V 9/18
[52] U.S. Cl. ..................................... 521/56; 521/57; 521/59; 521/60; 521/139; 521/140; 525/314; 525/901
[58] Field of Search .................. 525/314, 901; 521/56, 521/57, 59, 60, 139, 140

[56] References Cited

U.S. PATENT DOCUMENTS

| | | | |
|---|---|---|---|
| 2,857,339 | 10/1958 | Colwell | 521/59 |
| 2,857,340 | 10/1958 | Colwell | 521/59 |
| 3,558,534 | 1/1971 | Niechweadowicz | 521/59 |
| 3,956,203 | 5/1976 | Burger | 521/59 |
| 3,972,843 | 8/1976 | De Jong | 521/59 |
| 4,269,871 | 5/1981 | Blommers et al. | 521/59 |
| 4,304,881 | 12/1981 | Aoki et al. | 525/314 |

*Primary Examiner*—Morton Foelak
*Attorney, Agent, or Firm*—Lewis J. Young

[57] ABSTRACT

Expandable vinyl aromatic polymers are produced, which exhibit fast-cool properties upon formation of foamed articles therefrom, by polymerizing a vinyl aromatic monomer, in which is dissolved 1.0–10.0 percent, based on the monomer, of a thermoplastic, branched, block copolymer of 55–95 percent of polymerized vinyl aromatic monomer and 5–45 percent conjugated diene, the polymerization forming vinyl aromatic polymer containing the thermoplastic, branched, block copolymer, and impregnating the polymer so produced, with a blowing agent.

4 Claims, No Drawings

FAST-COOL VINYL AROMATIC EXPANDABLE POLYMERS

This is a divisional of application Ser. No. 462,158 filed Jan. 31, 1983 now U.S. Pat. No. 4,407,979.

Expandable vinyl aromatic polymer particles, such as polystyrene beads, are commercially prepared using aqueous suspension polymerization systems. After formation of the polymer particles, they are normally pre-expanded, such as is described in U.S. Pat. No. 3,023,175 and U.S. Pat. No. 3,577,360 and the pre-expanded particles are then used in the molding of foamed articles.

After the pre-expanded particles are fed to a mold cavity, which defines the shape of the foamed structure to be produced, the particles are heated above their softening point, such as by steam injected into the mold under pressure, and the particles expand to fill the mold cavity and fuse together to form a foamed article. After the particles have been treated in the mold to produce a foamed article, the article must be cooled for a relatively long time, depending on the size of the article, before it can be removed from the mold in a self-supporting state so as to retain it shape outside the mold. Since such foamed articles have good insulating properties, the cooling time in the mold consumes a significant part of the molding cycle and restricts the number of foamed articles that can be produced from a mold during a given time period.

The cooling time is not appreciably reduced by applying cooling media to the surface of the article or the mold surface since the heat transfer through the foamed article is extremely slow. Such slow heat transfer is evident by the insulative properties of such foamed articles. If such articles are removed from the confines of the mold too soon, the softness of the polystyrene and the pressure due to the hot interior of the article will cause the article to bulge and lose its desired shape.

Processes have been provided to reduce mold cooling time by addition of various compounds to polystyrene beads during polymerization in aqueous suspensions, such as are described in U.S. Pat. No. 3,389,097 and U.S. Pat. No. 3,503,908, or coating of polystyrene beads with surface active agents, such as is described in U.S. Pat. No. 3,480,570.

I have found that vinyl aromatic polymer particles in which thermoplastic, branched, block copolymers have been incorporated by polymerizing solutions of the vinyl aromatic monomer and the thermoplastic, branched, block copolymer, and which particles have been impregnated with a blowing agent, exhibit fast-cool characteristics in formation of foamed articles therefrom.

BRIEF SUMMARY OF THE INVENTION

Expandable polymer particles, which exhibit fast-cool properties, are produced by adding to an aqueous suspension system, a vinyl aromatic monomer in which is dissolved 1.0–10.0 percent by weight, based on the monomer, of a thermoplastic, branched, block copolymer of 55–95 weight percent of polymerized vinyl aromatic monomer and 5–45 percent conjugated diene, and effecting polymerization to form vinyl aromatic polymer particles containing said thermoplastic, branched, block copolymer, and impregnating the polymer particles with a blowing agent to form expandable vinyl aromatic polymer particles containing the thermoplastic, branched, block copolymer therein.

DESCRIPTION OF THE INVENTION

The present process provides for the production of expandable vinyl aromatic polymers having incorporated therein thermoplastic, branched, block copolymers and which exhibit fast-cool properties when molded.

Such vinyl aromatic polymers may be produced from various vinyl aromatic monomers such as styrene, alpha-methylstyrene, para-methylstyrene, para-t-butylstyrene, mono-chlorostyrene, dichlorostyrene, or mixtures thereof; as well as copolymerization of such vinyl aromatic monomers with monomers such as divinylbenzene, alkyl and allyl acrylates and methylcrylates, acrylonitrile, maleic anhydride, and the like, wherein the vinyl aromatic monomer is present in at least 50% by weight of the copolymer. The most common and preferred vinyl aromatic monomer is styrene or p-methylstyrene.

In accordance with the present process, the polymerization of the vinyl aromatic monomer is effected in a stable aqueous suspension in the presence of a thermoplastic, branched, block copolymer so as to incorporate the thermoplastic, branched, block copolymer in the polymer particles produced. The thermoplastic, branched, block copolymer is dissolved in the vinyl aromatic monomer and the solution is suspended and polymerization effected under conventional polymerization conditions.

Suspension polymerization techniques are well known. For example, a preferred method employs a suspension system comprised of an inorganic suspending agent, such as tricalcium phosphate and sodium bisulfite modifier. Other preferred suspension systems employ organic suspension stabilizers alone, such as polyvinyl alcohol, hydroxyethyl cellulose, polyvinyl pyrrolidone and the like. Equally useful suspension systems may employ combinations of inorganic and organic suspending agents, for example tricalcium phosphate and polyvinyl alcohol. An important advantage of the aqueous suspension systems is that the desired polymer particles may be obtained as beads of optimum size.

The polymerizations may be effected after immediate suspension of the monomer-thermoplastic, branched, block copolymer solution, or the monomer-block copolymer solution may be mass polymerized partially, then suspended and the polymerization completed in aqueous suspension. The polymer products of this invention can, of course, be produced by any of the known techniques, such as mass, suspension, or emulsion polymerization.

As used herein, the term "particles" is meant to cover beads, pellets, coarse grindings, and any other shape having sufficient porosity to allow impregnation without hard cores.

The thermoplastic, branched, block copolymer is present in an amount of 1–10 weight percent, based on the weight of the vinyl aromatic monomer and is preferably present in an amount of between 1.0 to 6.0 percent.

The thermoplastic, branched, block copolymer usable in the present process are those block copolymers containing 55–95 percent by weight of polymerized vinyl aromatic monomer and 5–45 percent by weight of a polymerized conjugated diene. The vinyl aromatic monomer may be styrene or alpha-methylstyrene. The preferred aromatic monomer is styrene. The conjugated diene may be butadiene or isoprene.

Such thermoplastic, branched, block copolymers are known compositions and may be formed, for example, according to the process described in U.S. Pat. No. 3,639,517. Especially useful thermoplastic, branched, block copolymers are available commercially, as for example, KRO-3, an approximately 75 percent polystyrene, 25 percent butadiene, sold by Phillips Petroleum Company.

The process of the present invention may be used with monomer-thermoplastic, branched, block copolymer solution to water ratios in the suspension which vary from about 0.3 to 1.5 parts by weight monomer solution per 1.0 part by weight water. The free-radical initiating catalysts which are added to the suspension system are the conventional oil-soluble (monomer soluble) catalysts such as organic peroxides, e.g. benzoyl peroxide and t-butyl perbenzoate. Other free-radical producing catalysts that may be used in the invention include azobisisobutyronitrile. Conveniently, conventional amounts of such catalysts are used in the invention.

The time and temperature cycles for the polymerization may be those conventionaly employed. Conveniently, the cycle described in Grim, U.S. Pat. No. 2,673,194, or the two-stage temperature cycle described in D'Alelio, U.S. Pat. No. 2,692,260 is employed. With such a two-stage cycle, in the first stage an elevated temperature of about 50°-90° C. is used for a period of about 3-7 hours, and a second stage uses polymerization temperatures in a range of about 100°-150° C. for a period of about 0.25 -5.0 hours.

The vinyl aromatic polymer particles, having the thermoplastic, branched, block copolymer incorporated threin, are rendered expandable by impregnating the particles with between 3-12 percent of a volatile blowing agent such as a gas or an agent which will produce a gas on heating. Such blowing agents are preferably one or more compounds selected from aliphatic hydrocarbons containing from 4 to 6 carbon atoms in the molecule, including butane, pentane, cyclopentane, hexane, cyclohexane, and the halogenated hydrocarbons which boil at a temperature below the softening point of the vinyl aromatic polymer. Such blowing agent, and processes for impregnating the vinyl aromatic polymer particles therewith, are well known, such as for example is described in U.S. Pat. No. 2,983,692. It is well known to those skilled in the art, that the blowing agent, or mixture of blowing agents, may be incorporated into the polymer particles during the aqueous suspension polymerization of monomer solutions.

The modified vinyl aromatic polymer particles, containing a volatile blowing agent, generally in an amount of about 3-12 percent, are pre-expanded by exposing the particles to heat, such as by subjecting them to steam, hot air or hot water, for example by use of a pre-expander as described in U.S. Pat. No. 3,023,175, as is commercially done. The pre-expanded particles are then permitted to stand under atmospheric conditions for a period of time, such as two hours to two days prior to charging the pre-expanded, aged particles to a mold for the formation of foamed articles.

It will be obvious to those skilled in the art that the present process may also be used for vinyl aromatic polymer particles that contain various other additives, such as flame retardant agents, dyes, pigments, antistatic agents, plasticizers, and the like.

The invention is further illustrated by the following examples wherein parts and percentages are by weight unless otherwise indicated.

EXAMPLE I

To a series of 12 oz. crown cap bottles there was charged 100 g water, 0.003 g sodium bisulfite, an amount of tricalcium phosphate (TCP) as listed in Table I, 0.35 g benzoyl peroxide, 0.05 g t-butyl-perbenzoate, and 100 g of a styrene-thermoplastic branched block copolymer solution containing the amount of thermoplastic, branched, block copolymer (TBBC) listed in Table I, which was a styrene-butadiene, branched, block copolymer (KRO-3; by Phillips Petroleum Company). The bottles were capped and suspension polymerization effected by end-over-end agitation of the bottles in a heated oil bath at 90° C. for a 6 hour period, followed by a 2 hour period at 115° C., and cooling to 25° C. over a period of 2 hours. The contents of the bottles were emptied and acidified to pH of 1.0 with hydrochloric acid and the removed polymer beads washed with water. The recovered beads were separated by sieving with different mesh sieves (U.S. Standard Sieve). A $-25+40$ bead size denotes beads which passed through a 25 mesh sieve and were retained on a 40 mesh sieve. Similarly, a $-16+25$ beads size denotes the beads which passed through a 16 mesh sieve and were retained on a 25 mesh sieve.

Portions of the beads were impregnated with n-pentane by charging to 12 oz. bottles, 100 g water containing 0.15 g Triton X-100 (an alkylaryl polyether of octylphenol containing 9-10 ethylene oxide units, Rohm & Haas Co.) as surfactant and 0.5 g tricalcium phosphate, 100 g beads and 8.1 g n-pentane. The bottles were capped and heated at 112° C. for 2 hours with end-over-end agitation. After cooling to room temperature the contents were acidified to a pH of about 1.0, centrifuged, filtered and washed with water, then tray dried at room temperature.

Beads were next pre-expanded in a loosely-capped unstirred five gallon batch expander by heating for two minuted in steam delivered from a 0.25 inch line at a pressure of 12 psig to give densities of approximately 1.0 pound per cubic foot (pcf), while higher densities were attained by bleeding air into the steam line to reduce the steam temperature when conducting the pre-expansion or by shortening the time of contact. After aging overnight, the beads were molded into cylindrical moldings 2 inches in thickness and 8 inches in diameter. Cool times were determined and the molded specimens examined for appearance, dimensional stability and degree of fusion.

The results are listed in Table I:

TABLE I

| Run No. | TBBC (%) | TCP (g) | Bead Size | Density of Pre-puff (pcf) | Cool Time (sec) |
|---|---|---|---|---|---|
| 1 | 0 | 0.3 | $-16 + 25$ | 1.0 | 85 |
| 2 | 1 | 0.3 | $-16 + 25$ | 0.98 | 85 |
| 3 | 2 | 0.3 | $-16 + 25$ | 1.06 | 72 |
| 4 | 1 | 0.5 | $-25 + 40$ | 0.98 | 55 |
| 5 | 2 | 0.5 | $-25 + 40$ | 1.02 | 38 |
| 6 | 2 | 0.5 | $-25 + 40$ | 0.98 | 36 |
| 7 | 2 | 0.75 | $-35 + 50$ | 1.10 | 34 |

Formed article appearance was good, as was fusion and dimensional stability. The use of about one percent thermoplastic, branched, block copolymer showed only marginal improvement, if any. Smaller bead sizes normally produce foams which cool faster than foams formed from larger bead sizes.

The beads produced in the suspension polymerization prior to impregnation with n-pentane were transparent when extruded.

EXAMPLE II

In order to determine cool times of higher density pre-expanded beads, a further series of bead polymerizations and impregnations (8–13) were conducted according to the procedure of Example I. The beads utilized in Runs 9 and 12 were made using initiator levels of 0.35 g benzoyl peroxide (BPO) and 0.05 g t-butyl perbenzoate (t-BP); while in Runs 10 and 13 there was used 0.32 g BPO and 0.05 g t-BP. The polymerization cycle was 6 hours at 90° C. and 4 hours at 120° C. A commercial polystyrene was used in Runs 8 and 11. Impregnation of the beads was effected as in Example I, except that in Runs 11, 12 and 13, 0.16% Triton X-165 (an alkylaryl polyether of octylphenol containing 16 ethylene oxide units; Rohm & Haas Co.) was substituted as surfactant. The amount of thermoplastic, branched, block copolymer is designated in Table II which lists the results of cool time tests on beads of a size −25+40:

TABLE II

| Run No. | TBBC (%) | Density of Pre-Puff (pcf) | Cool Time (sec) |
|---|---|---|---|
| 8 | 0 | 1.81 | 92 |
| 9 | 2 | 1.93 | 54 |
| 10 | 2 | 2.05 | 50 |
| 11 | 0 | 1.93 | 72 |
| 12 | 2 | 1.97 | 53 |
| 13 | 2 | 2.10 | 58 |

Foam appearance and fusion were good in all cases.

EXAMPLE III

Polystyrene −16+30 mesh beads containing 2.6 percent KRO-3 were made in a stirred 100-gallon reactor using a suspension polymerization recipe and cycle comparable to that used in Example I, except that the final finishing temperature was 130°14 135° C. two hours. The pre-expanded beads produced, upon impregnation with n-pentane, showed the following: density of 1.54 pcf gave cool time of 46 sec.; density of 1.58 pcf gave cool time of 53 sec. In contrast, straight polystyrene beads of density 1.64 pcf gave a cool time of 148 sec. while such beads even of a low density of 1.08 pcf gave a cool time of 81 sec.

EXAMPLE IV

Beads containing 0.25, 0.5, 5.0 and 10.0% KRO-3 were prepared in bottles via suspension polymerization similar to previously described examples, using 0.35/0.05 BPO/t-BP initiators and a 90° C./6.0 hour, 135° C./2.0 hour polymerization cycle. Impregnation of the above beads along with two commercial polystyrene bead samples and the 2.6% KRO-3 beads made in the 100 gallon reactor with n-pentane was effected at 115° C./2 hours in the presence of 0.16% Triton X-165. The cool times of the molded pre-expanded beads are summarized in Table III.

TABLE III

| Run No. | KRO-3 (%) | Bead Size | Density of Pre-puff (pcf) | Cool Time (sec) |
|---|---|---|---|---|
| 14 | 0 | −16 + 30 | 1.37 | 93 |
| 15 | 0 | −16 + 30 | 1.43 | 98 |
| 16 | 0.2 | −16 + 30 | 1.37 | 88 |
| 17 | 0.5 | −16 + 30 | 1.34 | 86 |
| 18 | 2.6 | −16 + 30 | 1.28 | 23 |
| 19 | 5.0 | −16 + 30 | 1.51 | 41 |
| 20 | 10.0 | −16 + 30 | 1.32 | 47 |
| 21 | 0 | −25 + 40 | 1.43 | 76 |
| 22 | 5 | −30 + 40 | 1.55 | 21 |
| 23 | 10 | −30 + 40 | 1.68 | 31 |

It is clear from the results in Table III and the prior results that the incorporation of >1.0% KRO-3 results generally in cool time reductions of 40–75% as compared to the homo polystyrene controls.

A further advantage of the present process is the fact that the polymer particles produced containing the thermoplastic, branched, block copolymers are transparent when extruded. This is in contrast to vinyl aromatic polymer particles containing various elastomers. Thus, in instances where a bead size of polymer particles resulted, which was not specifically desirable at the time, the off-size particles or beads could be readily blended with crystal polystyrenes as a saleable product.

What is claimed is:

1. Expandable vinyl aromatic polymer particles consisting of vinyl aromatic polymer particles containing dispersed throughout (1) 1 to 10 percent by weight of a thermoplastic, branched, block copolymer of 55–95 weight percent of polymerized vinyl aromatic monomer and 5–45 weight percent of polymerized conjugated diene and (2) a blowing agent; said expandable particles exhibiting fast-cooling properties in molded products produced therefrom.

2. Expandable polystyrene particles consisting of polystyrene particles containing dispersed throughout (1) 1 to 10 percent by weight of a thermoplastic, branched, block copolymer of 55–95 weight percent of polystyrene and 5–45 weight percent of polybutadiene and (2) a blowing agent; said expandable polystyrene particles exhibiting fast-cooling properties in molded products produced therefrom.

3. The expandable particles of claim 1 wherein said thermoplastic, branched, block copolymer is formed from a vinyl aromatic monomer selected from the group consisting of styrene and alpha-methylstyrene, and from a conjugated diene selected from the group consisting of butadiene and isoprene.

4. The expandable particles of claim 1 wherein said blowing agent is selected from the group consisting of aliphatic hydrocarbons having 4 to 6 carbon atoms; halogenated hydrocarbons which boil at a temperature below the softening point of the vinyl aromatic polymer, and mixtures thereof.

* * * * *